(12) United States Patent
Voigt et al.

(10) Patent No.: US 9,656,192 B2
(45) Date of Patent: May 23, 2017

(54) STACK OF MEMBRANE FILTER POCKETS COMMONLY POTTED AT THEIR CORNERS

(71) Applicant: WTA Vogtland GmbH, Plauen (DE)

(72) Inventors: Reinhard Voigt, Gotha (DE); Kurt Bock, Erfurt (DE); Eberhard Semmler, Blankenhain OT Meckfeld (DE); Volker Albrecht, Plauen (DE); Barbara Zimmerman, Duisburg (DE)

(73) Assignee: WTA Vogtland GmbH, Plauen (DE)

( * ) Notice: Subject to any disclaimer, the term of this patent is extended or adjusted under 35 U.S.C. 154(b) by 0 days.

(21) Appl. No.: 14/430,091

(22) PCT Filed: Sep. 21, 2012

(86) PCT No.: PCT/EP2012/068622
§ 371 (c)(1),
(2) Date: Mar. 20, 2015

(87) PCT Pub. No.: WO2014/044319
PCT Pub. Date: Mar. 27, 2014

(65) Prior Publication Data
US 2015/0209700 A1    Jul. 30, 2015

(51) Int. Cl.
*B01D 29/56* (2006.01)
*B01D 63/00* (2006.01)
*B01D 63/08* (2006.01)
*B01D 61/18* (2006.01)
*C02F 1/44* (2006.01)

(52) U.S. Cl.
CPC ............. *B01D 29/56* (2013.01); *B01D 61/18* (2013.01); *B01D 63/00* (2013.01); *B01D 63/08* (2013.01);
(Continued)

(58) Field of Classification Search
CPC ...... B01D 63/00; B01D 63/08; B01D 63/081; B01D 63/082; B01D 2315/06;
(Continued)

(56) References Cited

U.S. PATENT DOCUMENTS 8,366,929 B2    2/2013  Masutani et al.
8,470,174 B2    6/2013  Kiene et al.
(Continued)

FOREIGN PATENT DOCUMENTS

CN    1575197        2/2005
CN    102209584     10/2011
(Continued)

OTHER PUBLICATIONS

Chinese Office Action for Chinese Application No. 201280076246.6, Dated Dec. 11, 2015, 6 Pages.
(Continued)

*Primary Examiner* — Katherine Zalasky
*Assistant Examiner* — Benjamin Lebron
(74) *Attorney, Agent, or Firm* — Muncy, Geissler, Olds & Lowe, P.C.

(57) ABSTRACT

A filter element for cleaning liquids, having a stack of at least two filter membrane pockets, which are substantially flat and include a flexible, liquid-permeable filter material for retaining waste particles and/or microbes, wherein each filter membrane pocket has a substantially polygonal shape with at least three corners and a corresponding number of edges, wherein the filter membrane pockets are stacked with a defined distance and aligned with each other, wherein aligned corners of the filter membrane pockets are embedded in a casting covering only part of the adjacent edges such that the casting for each corner is spaced from the castings of the neighboring corners.

18 Claims, 8 Drawing Sheets

(52) U.S. Cl.
CPC ......... *B01D 63/081* (2013.01); *B01D 63/082* (2013.01); *B01D 2313/02* (2013.01); *B01D 2313/025* (2013.01); *B01D 2313/06* (2013.01); *B01D 2313/12* (2013.01); *B01D 2313/20* (2013.01); *B01D 2313/21* (2013.01); *B01D 2315/06* (2013.01); *C02F 1/44* (2013.01); *C02F 1/444* (2013.01)

(58) Field of Classification Search
CPC .......... B01D 2313/02; B01D 2313/025; B01D 2313/06; B01D 2313/20; B01D 2313/21; B01D 2313/12; B01D 29/56; C02F 1/44; C02F 1/444
See application file for complete search history.

(56) References Cited

U.S. PATENT DOCUMENTS

| | | | |
|---|---|---|---|
| 8,778,183 | B2 | 7/2014 | Nakagawa et al. |
| 2003/0121855 | A1 | 7/2003 | Kopp |
| 2005/0000881 | A1 | 1/2005 | Bruss |
| 2010/0000935 | A1* | 1/2010 | Sakai ................... B01D 63/082 210/455 |
| 2011/0240538 | A1 | 10/2011 | Masutani et al. |
| 2012/0067809 | A1 | 3/2012 | Nakagawa et al. |

FOREIGN PATENT DOCUMENTS

| | | |
|---|---|---|
| DE | 10151833 | 5/2003 |
| JP | 2001104759 | 4/2001 |
| JP | 2011255305 | 12/2011 |
| WO | 9506514 | 3/1995 |
| WO | 03037489 | 5/2003 |
| WO | 2009109308 | 9/2009 |
| WO | 2011092804 | 8/2011 |

OTHER PUBLICATIONS

International Search Report for PCT/EP2012/068622, Completed by the European Patent Office on Jun. 3, 2013, 4 Pages.

* cited by examiner

STACK OF MEMBRANE FILTER POCKETS COMMONLY POTTED AT THEIR CORNERS

CROSS-REFERENCE TO RELATED APPLICATION

This application is the U.S. national phase of PCT Application No. PCT/EP2012/068622 filed on Sep. 21, 2012, the disclosure of which is incorporated in its entirety by reference herein.

The invention relates to a filter element and a filter arrangement for cleaning a liquid, for example waste water.

Conventional filter systems for cleaning waste water consist of filter units with a chassis comprising a number of filter membrane cartridges, which are mutually spaced.

DE 10 151 833 A1 discloses a filtration module for purifying waste water. Said module comprises a plurality of filter membrane pockets having at least one opening for draining the inner region of the same. Said pockets are vertically arranged in a rigid supporting element in a parallel manner, preferably at the same distance from each other, in such a way that the gaps between adjacent filter membrane pockets can be intensively crossed by a liquid. The filtration module is characterised in that the filter membrane pockets are essentially plane and flexible and are fixed to the supporting element on opposite sides, said supporting element comprising at least one evacuation line for evacuating the liquid which is sucked out via the filter membrane pocket openings. Furthermore, the filter membrane pockets have a flexible, liquid-permeable core and a plurality of flexible, liquid-permeable core elements.

It is an object of the present invention to provide an improved filter element and an improved filter arrangement for cleaning a liquid, for example waste water.

The object is achieved by a filter element according to claim 1 and by a filter arrangement according to claim 12.

Advantageous embodiments are subject of the dependent claims.

According to the invention a filter element for cleaning liquids comprises a stack of at least two filter membrane pockets, which are substantially flat and comprise a flexible, liquid-permeable filter material suitable for retaining waste particles and/or microbes, wherein each filter membrane pocket has a substantially polygonal shape with at least three corners and a corresponding number of edges, wherein the filter membrane pockets are stacked with a defined distance and aligned with each other, wherein aligned corners of the filter membrane pockets are embedded in a casting covering only part of the adjacent edges such that the casting for each corner is spaced from the castings of the neighbouring corners.

The casting may consist of or comprise plastics such as synthetic resin.

The stack may comprise more than two filter membrane pockets, for example 25 or 50 filter membrane pockets.

Typically, the filter membrane pockets respectively comprise two flat, planar membranes which are pressure tightly connected to each other around their edges. The interior of the membrane pocket is accessible by an opening for allowing the filter membrane pocket to be siphoned off. A flat, planar drain element may be arranged between the membranes within the pocket. The drain element may be partially or completely fixed to the membranes, e.g. around the edges of the membrane pocket. The membranes may likewise be deposited directly onto the drain element. The drain element may be flexible or rigid.

Typically, when subjected to the liquid to be cleaned, the filter membrane pockets soak and hence tend to expand. In conventional filter elements, where a casting covers an edge and the two adjacent corners of a filter membrane pocket, soaking results in tensions, wrinkles and eventually rupture or other damage to the filter elements, e.g. near the castings, at least in long-term operation.

The filter element according to the invention by contrast allows for changes in length of the filter membrane pocket between the corners, so that the filter element can be tightened even when expanded due to soaking or creepage. Thus the risk for mechanical damage to the filter elements is remarkably reduced and the distance between the filter membrane pockets may be defined and maintained substantially constant. In particular, all filter membrane pockets may be maintained equidistant with respect to their neighbouring filter membrane pockets within the filter element. This allows for a uniform cross flow of the liquid to be cleaned between and in parallel to the faces of all neighbouring filter membrane pockets. Furthermore, in the filter element according to the invention a substantial part of the edges remains in the cross flow thus increasing the effective surface of the filter element.

The cross flow of the liquid to be cleaned can be improved by ventilation with a gas such as air.

In an exemplary embodiment at least one of the castings comprises an opening for accessing an interior of the filter membrane pockets. Likewise, the opening may be arranged in the face of the filter membrane pocket, however the opening in the casting is preferred as the opening in the face of the membrane pocket results in a statically over-determinate system, so that not all parts of the filter element may be tightened. This conventional setup may result in tensions, wrinkles and eventually rupture or other damage to the filter elements, at least in long-term operation. Furthermore, arranging the opening in the face of the filter membrane pocket disturbs the uniform cross flow of the liquid to be cleaned as the terminal of the opening locally shades the cross flow. This is prevented by arranging the opening through the casting in the corner resulting in improved cleaning efficiency. Furthermore, the effort for assembling the opening to the filter element and the related costs are remarkably reduced.

The opening in the casting may be obtained by machining, e.g. milling or drilling.

The filter element may comprise at least two openings thus allowing for purging the interior, also referred to as a permeate volume, of the filter membrane pockets for cleaning and disinfecting the filter element. By contrast, filter membrane pockets with only one opening can only be cleaned by back-flushing. The more openings are arranged, the more directions (diagonal, horizontal, vertical) are available within the filter membrane pocket for purging it further improving cleaning efficiency.

The number and cross section of the openings and respective terminals may be varied in order to adapt the filter element to different filtering applications.

In an exemplary embodiment the opening is arranged as a bore substantially arranged at right angles with respect to a plane in which the filter membrane pockets extend.

In an exemplary embodiment each casting covers at most 25%, preferably at most 10% of the length of each edge adjacent the respective corner.

In an exemplary embodiment at least one of the openings is arranged at an upper edge for venting the filter. The upper edge is defined to be the edge of the filter element or filter membrane pocket, which is intended to point upwards when applied in a filter arrangement. This setup allows for completely venting the filter element, in particular in comparison with filter elements, which have the opening in the face of the filter membrane pocket resulting in a volume above the opening which cannot be evacuated so that the filter is less efficient due to its reduced surface.

In an exemplary embodiment at least one of the castings comprises a bore substantially arranged at right angles with respect to a plane in which the filter membrane pockets extend, wherein the bore is arranged to receive a rod for suspending the filter element. In some conventional filter elements each filter membrane pocket has individual fasteners with bores at the corners for receiving a similar rod. However, in order to achieve uniform tension of all filter membrane pockets when biased, this conventional setup requires very low positioning tolerances and hence increased manufacturing costs when attaching the fasteners. Due to the aligned corners embedded in the casting of the filter membrane pockets according to the invention uniform tension is inherent so that manufacturing costs may be reduced and manufacturing can be improved by a high level of automation.

In an exemplary embodiment at least one of the castings comprises the bore and the remaining castings comprise respective retaining structures for being engaged by biasing elements such that the filter element may be tightened at each corner with respect to the neighbouring corners. The distance between the castings is thus variable so as to allow for tightening the filter element as opposed to conventional arrangements with rigidly interconnected corners which do not allow for tightening the filter elements when expanded due to moisture resulting in wrinkles and oscillations in the cross flow. The resulting turbulences tend to intensify the oscillations leading to reduced cleaning efficiency and accelerated wear of the filter element.

The filter element may be arranged as an adaptor element having an upwardly directed flange with a pipe in fluid communication with the opening arranged on at least one of the castings. The adaptor element may be arranged between two of the other filter elements for connecting the filter elements by the upwardly directed flanges. This allows for saving space as opposed to a lateral connection at the openings of the filter elements.

The casting or castings with the flange in the adaptor element may comprise a second opening in parallel to the opening, wherein the two openings are interconnected by a connecting bore. The second opening serves for allowing access to the interior of the filter membrane pockets regardless of the space requirements of the radial gasket seals and the pipe of the flange which may extend considerably into the casting.

At least one filter element may be comprised in a filter arrangement, further comprising a chassis for receiving the filter element or filter elements. The chassis may be dimensioned to provide a distance between the outermost filter membrane pockets of the stack and a wall of the chassis equaling the distance between the neighbouring filter membrane pockets within the stack.

In an exemplary embodiment the filter arrangement comprises at least one rod arranged for engaging a respective bore in one of the castings of the filter element, wherein the rod is retained in the chassis, wherein at least one biasing element is arranged for engaging the retaining structure and tightening the filter element. The distance between the castings is thus variable so as to allow for tightening the filter element.

In one embodiment the filter element has three corners with respective castings. One of the corners may be held by the rod in the chassis while the other two corners may be tightened by the biasing elements.

In an exemplary embodiment respective bores are arranged in two neighbouring castings.

In an exemplary embodiment two rods are arranged for engaging bores in two neighbouring castings, wherein the two rods are radially guided on inclined surfaces such that the edge of the filter element between these neighbouring castings is tightened when the biasing elements pull on the remaining castings of the filter element. This allows for a self-adjusting arrangement of the filter elements such that requirements to the manufacturing precision of both the chassis and the filter element may be lowered thereby reducing costs. Furthermore, this self adjusting arrangement allows for maintaining a constant tightness of the filter element throughout its life cycle and reduces static stress to the chassis due to over-tension as in some conventional filter arrangements.

In one embodiment the filter element has three corners with respective castings. Two of the corners may be held by rods on the inclined surfaces in the chassis while the remaining corner may be tightened by the biasing element.

In another embodiment the filter element has four corners with respective castings. Two of the corners may be held by rods on the inclined surfaces in the chassis while the remaining other two corner may be tightened by respective biasing elements.

Filter elements with five or more corners may likewise be manufactured.

In an exemplary embodiment the biasing elements are switchable. For this purpose, the biasing elements may be arranged as pneumatic cylinders which may for example be subjected to compressed air. This allows for relaxing the filter elements prior to use or when temporarily not in use thus avoiding creepage by switching the biasing elements off. The biasing elements may be switched on for biasing the filter element when starting operation. By contrast, a conventional biasing element such as a steel spring permanently biases the filter elements. Taking into account the soaking of the filter element when subjected to moisture the steel springs have to over-tension the dry filter element in order to provide enough tension to the wet and hence expanded filter element. This over-tension may result in creepage of the filter elements prior to use and hence insufficient tightness in operation, wrinkles, ruptures and non-uniform cross flow.

In an exemplary embodiment at least two filter elements are arranged in series, wherein the openings of the filter elements are respectively interconnected by a radial gasket seal. Thus, filter elements can be combined for forming larger filter units.

In an exemplary embodiment the radial gasket seal comprises a conical outer surface. This allows for reliably sealing and interconnecting the openings of neighbouring filter elements arranged in series.

In an exemplary embodiment the chassis comprises guiding structures for guiding the cross flow of the liquid.

In an exemplary embodiment at least one air ventilation unit is arranged in the chassis. Likewise the air ventilation unit may be part of an adapter matching the chassis.

The chassis may be dimensioned to receive more than one filter elements or series of filter elements arranged on top of each other in order to increase the filter surface with respect to the footprint of the filter arrangement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. The present invention will become more fully understood from the detailed description given hereinbelow and the accompanying drawings which are given by way of illustration only, and thus, are not limitive of the present invention, and wherein:

Corresponding parts are marked with the same reference symbols in all figures.

Figure 1:
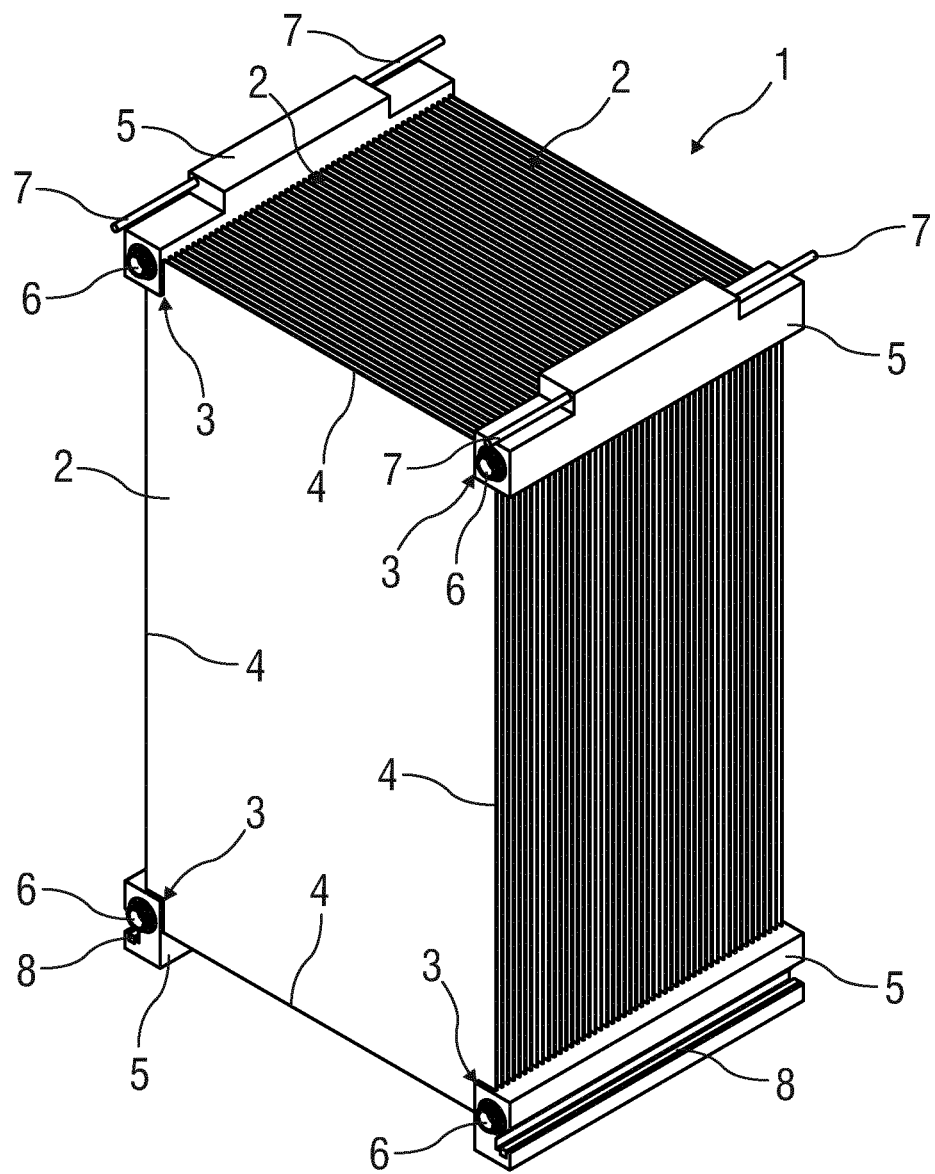
FIG. 1 is a schematic perspective view of a filter element.

FIG. 1 is a schematic perspective view of a filter element 1 for cleaning liquids such as waste water. The filter element 1 comprises a stack of filter membrane pockets 2, which are substantially flat and comprise a flexible, liquid-permeable filter material for retaining waste particles and/or microbes. Each filter membrane pocket 2 has a rectangular shape with four corners 3 and a corresponding number of edges 4. The filter membrane pockets 2 are stacked with a defined distance and aligned with each other. The aligned corners 3 of the filter membrane pockets 2 are embedded in a respective casting 5 covering only part of the adjacent edges 4 such that the casting 5 for each corner 3 is spaced from the castings 5 of the neighbouring corners 3.

The castings 5 comprise a respective opening 6 for accessing an interior of the filter membrane pockets 2.

The openings 6 are arranged as bores substantially arranged at right angles with respect to a plane in which the filter membrane pockets 2 extend. The bores extend both through the casting 5 and through part of the filter membrane pocket 2 in the area of the corner 3.

Two neighbouring of the castings 5 facing upwards in FIG. 1 comprise respective bores substantially arranged at right angles with respect to the plane in which the filter membrane pockets 2 extend, wherein these bores are arranged to receive respective rods 7 for suspending the filter element 1. The rods 7 may be arranged to be loosely inserted or moulded in the casting 5.

The remaining two castings 5 at the bottom of FIG. 1 comprise respective retaining structures 8, e.g. arranged as notches with a back tapering edge for being engaged by biasing elements (cf. FIG. 5) such that the filter element 1 may be tightened at each corner 3 with respect to the neighbouring corners 3.

Figure 2:
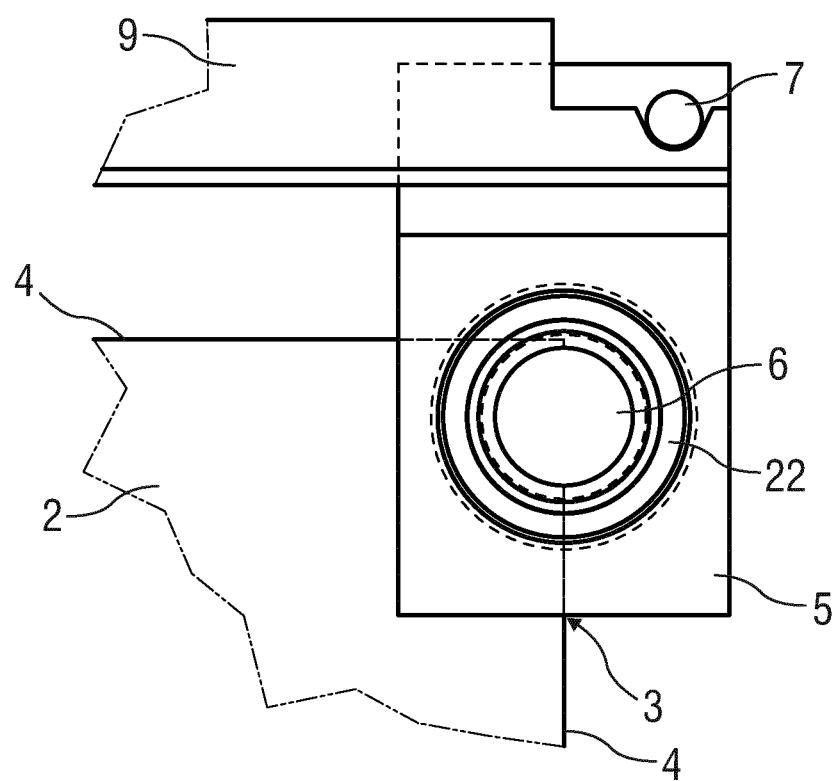
FIG. 2 is a schematic detail front view of the filter element.
Figure 3:
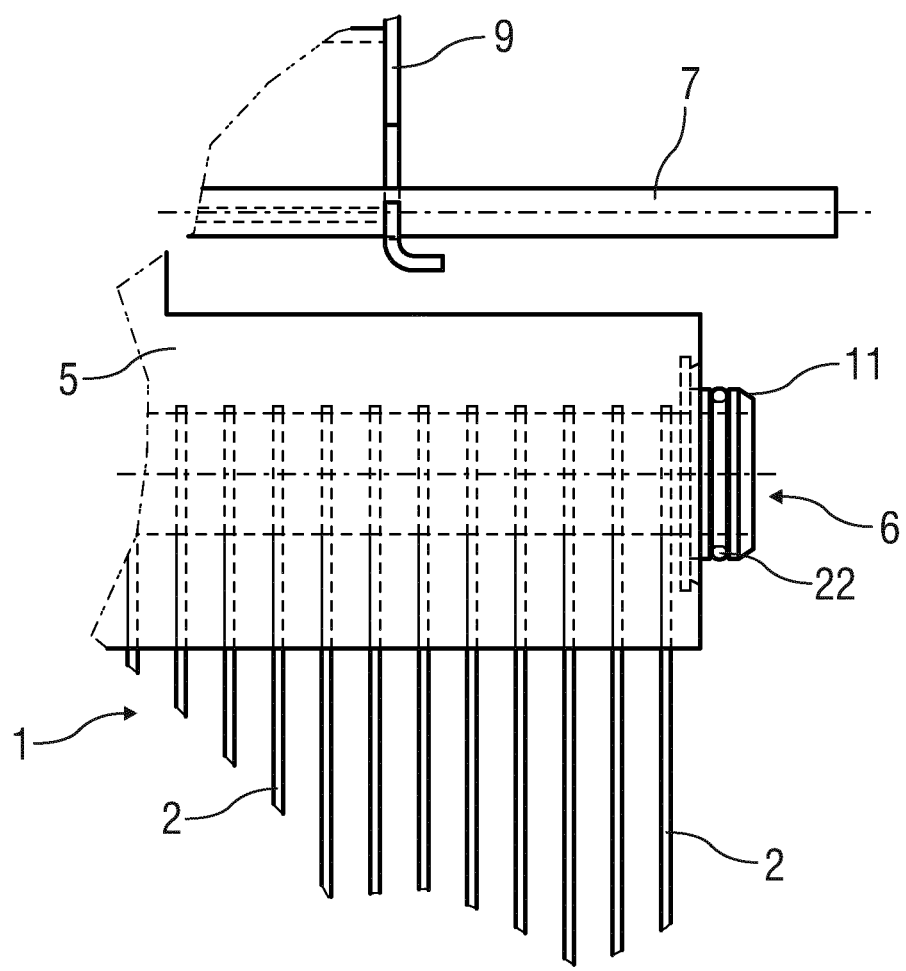
FIG. 3 is a schematic detail side view of the filter element.
Figure 4:
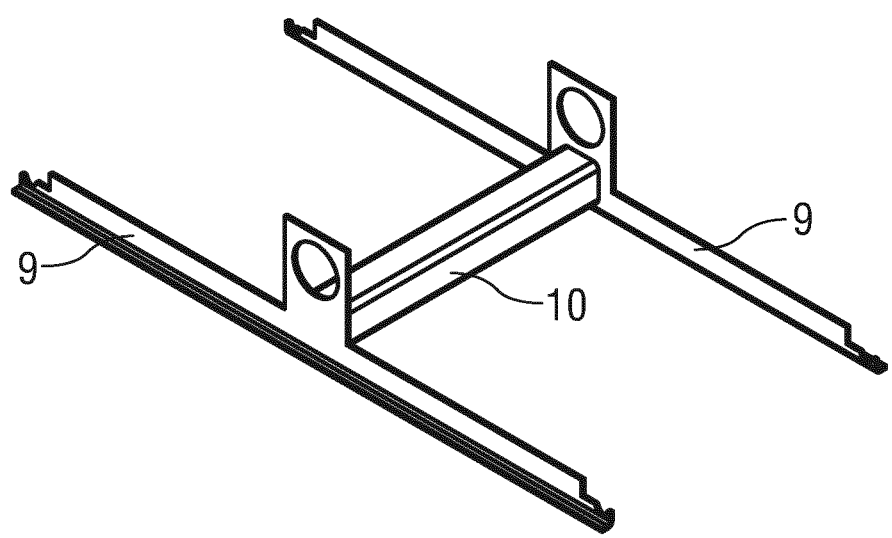
FIG. 4 is a schematic perspective view of a bracket.

FIG. 2 is a schematic detail front view showing a corner 3 of a filter element 1 with the casting 5, the opening 6 and the rod 7. FIG. 3 is a related schematic detail side view. The rod 7 is engaged in a bracket 9. The bracket is illustrated in more detail in FIG. 4. The bracket 9 is engaged to both rods 7 at the two upper castings 5 of the filter element 1 and serves for suspending the filter element 1 when not installed in a chassis of a filter arrangement thus keeping the filter element 1 from collapsing and preventing damage to the filter element 1. A respective bracket 9 is arranged in the range of both ends of the stack of filter membrane pockets 2. A connecting bracket 10 is arranged between the two brackets 9 for facilitating handling and storing the filter element when not in use or during insertion into or removal from a chassis. The brackets 9 may be mould in the casting 5. The brackets 9 are sufficiently resilient for allowing the rods 7 to be pulled apart for further tightening the filter element 1. For this purpose the brackets 9 may be curved (not illustrated) between its ends connected to the rods 7 so as to have an arch shape.

Referring again to FIGS. 2 and 3 the opening 6 of the filter element 1 is equipped with a radial gasket seal 22 for connecting to piping or tubing or to another filter element 1 to be arranged in series. The radial gasket seal 22 comprises a conical outer surface 11. The radial gasket seal 22 may be arranged as a separate part or mould in the casting 5.

Figure 5:
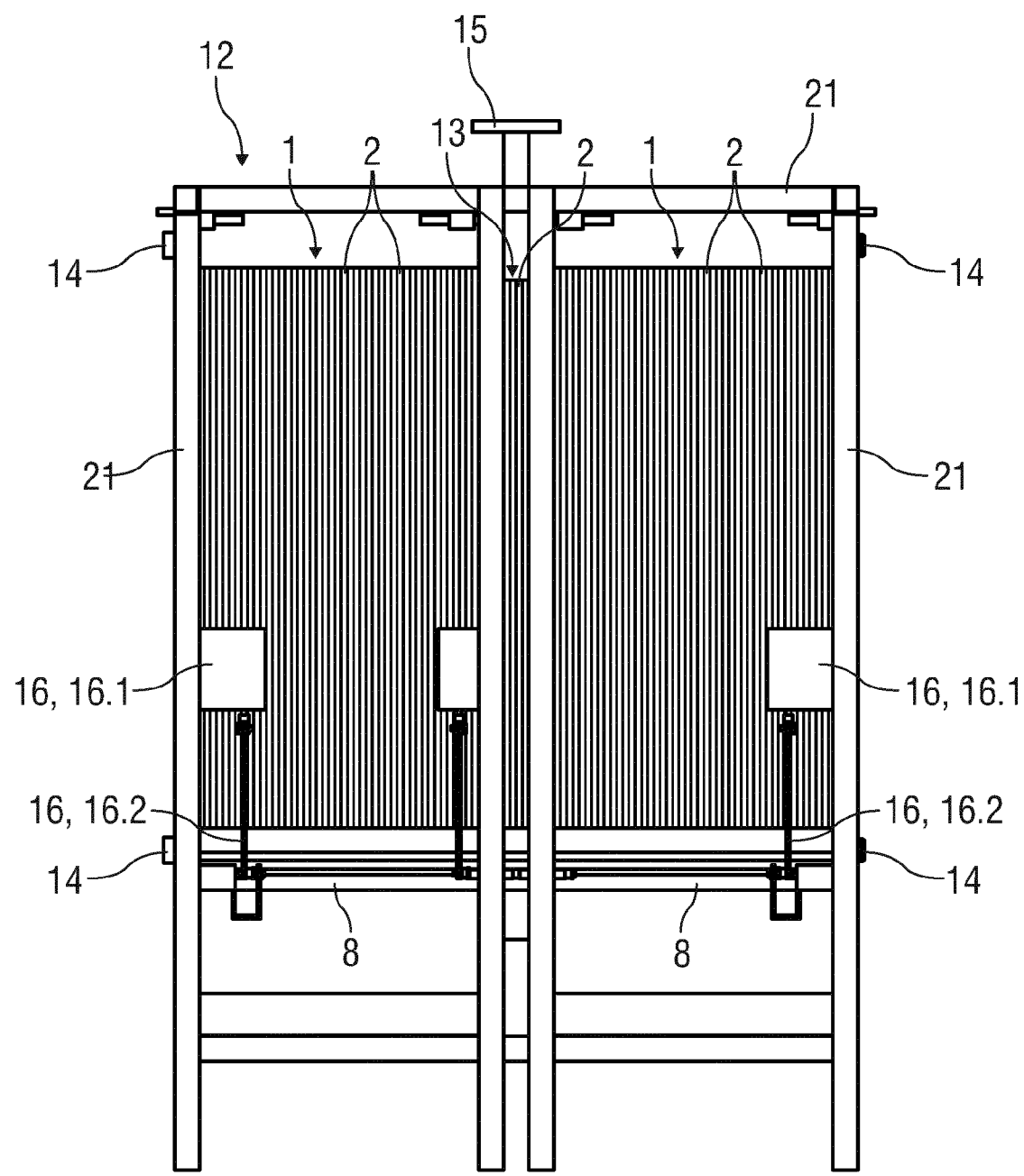
FIG. 5 is a schematic side view of a filter arrangement.
Figure 6:
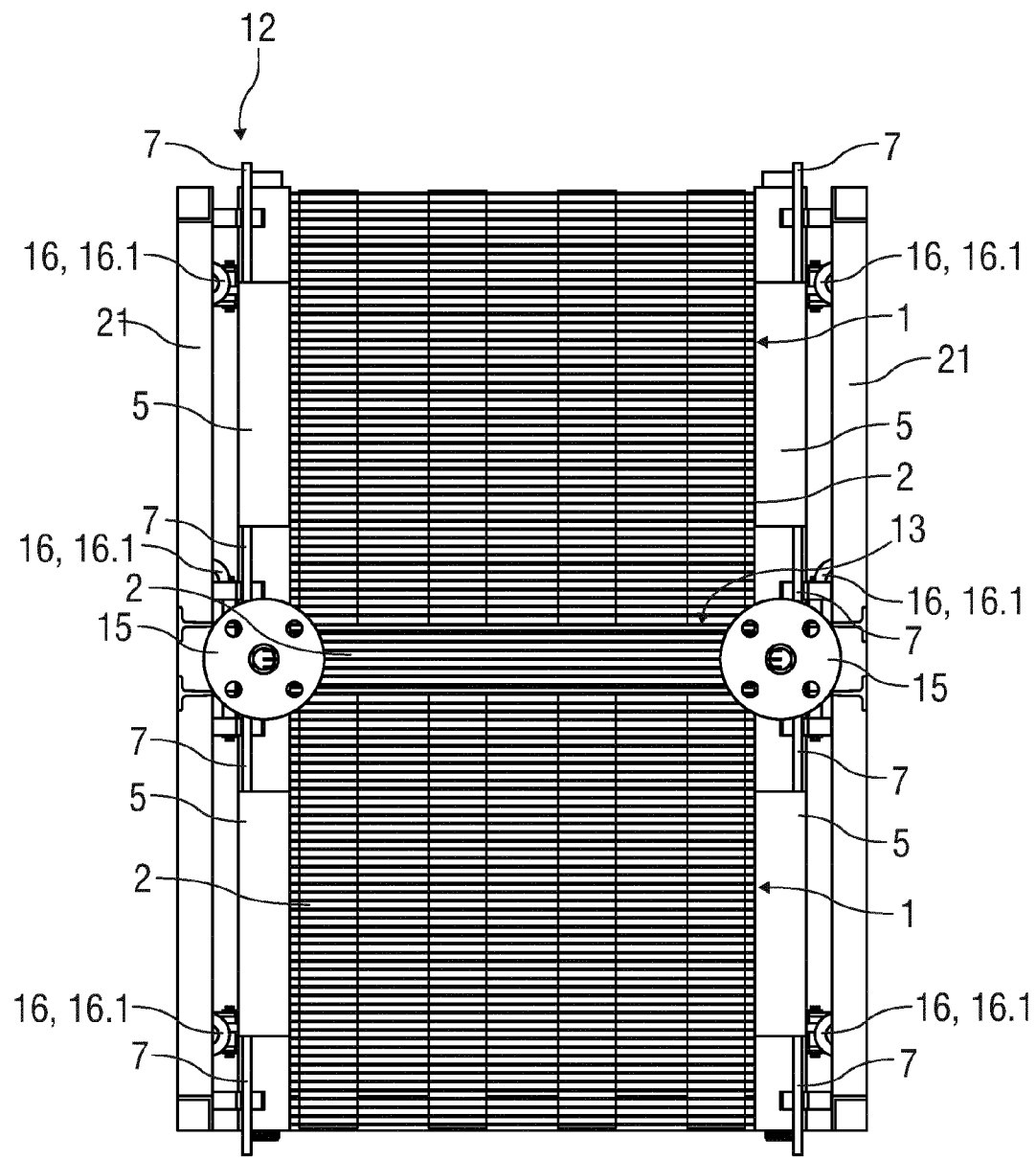
FIG. 6 is a schematic top view of the filter arrangement.
Figure 7:
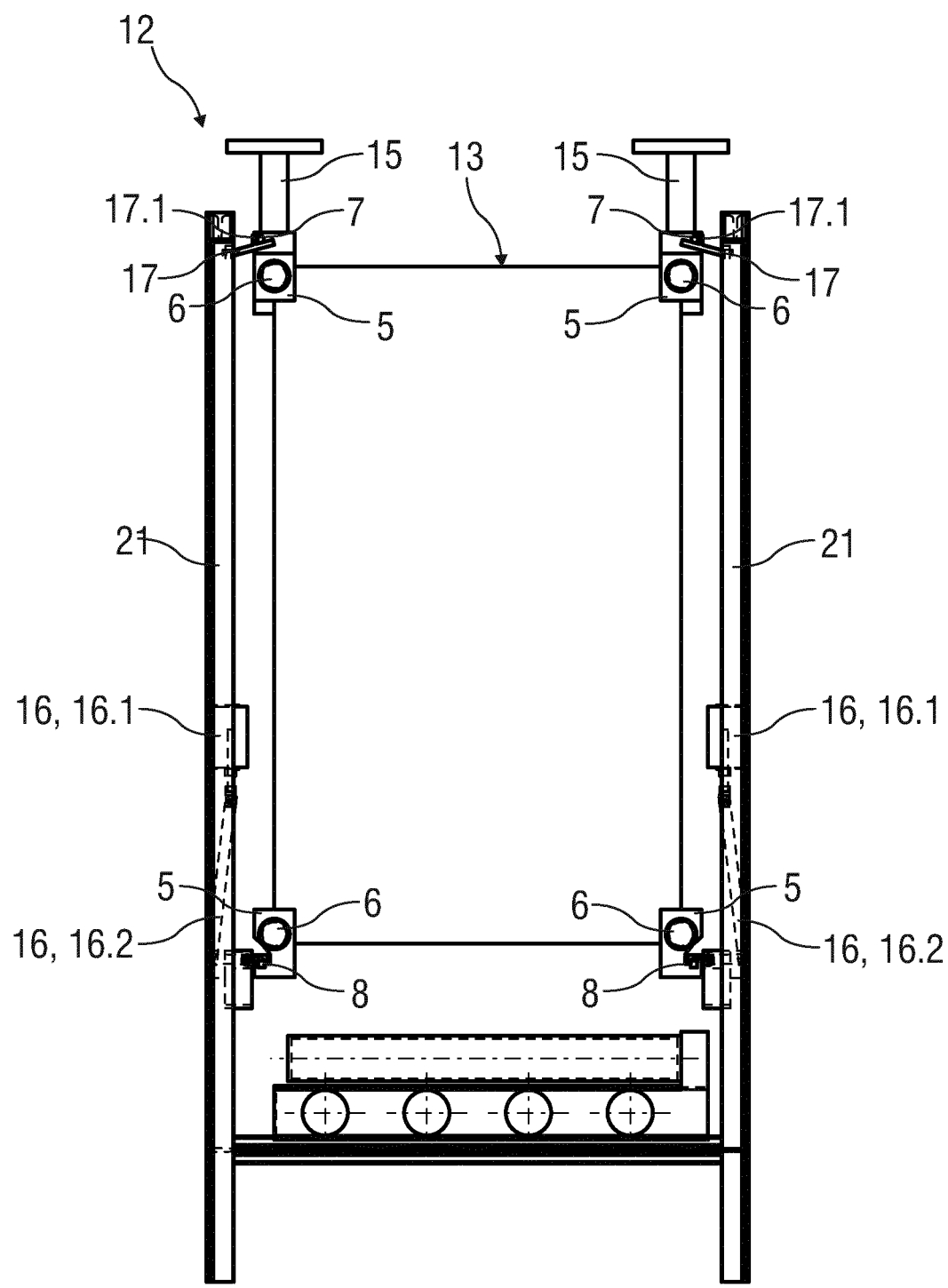
FIG. 7 is a schematic front view of the filter arrangement.
Figure 8:
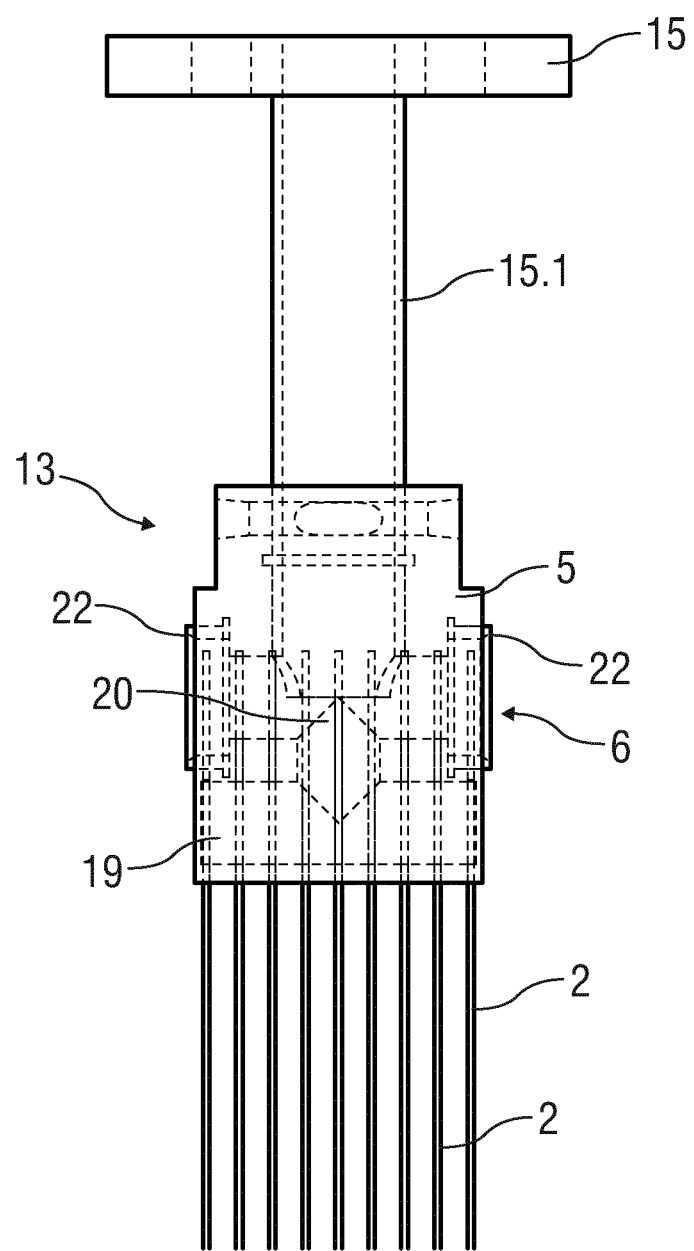
FIG. 8 is a schematic side view of an adaptor element.

FIG. 5 is a schematic side view of a filter arrangement 12 comprising two filter elements 1 arranged in series and the chassis 21 for receiving the filter elements 1. FIG. 6 is a related top view; FIG. 7 is a related front view. An adaptor element 13 is arranged between the two filter elements 1. The adaptor element 13 (see FIG. 8 for details) is arranged similar to the filter elements 1 comprising a stack of filter membrane pockets 2, which are substantially flat and comprise a flexible, liquid-permeable filter material for retaining waste particles and/or microbes. Each filter membrane pocket 2 has a rectangular shape with four corners 3 and a corresponding number of edges 4. The filter membrane pockets 2 are stacked with a defined distance and aligned with each other. The aligned corners 3 of the filter membrane pockets 2 are embedded in a respective casting 5 covering only part of the adjacent edges 4 such that the casting 5 for each corner 3 is spaced from the castings 5 of the neighbouring corners 3. The number of filter membrane pockets 2 in the adaptor element 13 is typically smaller than in the filter elements 1. The castings 5 of the adaptor element 13 comprise a respective opening 6 for accessing an interior of the filter membrane pockets 2. The openings 6 in the castings 5 of the adaptor element 13 are arranged as bores substantially arranged at right angles with respect to a plane in which the filter membrane pockets 2 extend. The bores extend both through the casting 5 and through part of the filter membrane pocket 2 in the area of the corner 3. The upper castings 5 may comprise bores 18 for receiving the rods 7 of neighbouring filter elements 1. Likewise, the adaptor element 13 may have its own rods 7. The adaptor element 13 is a particular embodiment of the filter element 1.

Referring again to FIGS. 5 to 7, the openings 6 of the castings 5 in the filter elements 1 facing the adaptor element 13 are connected to the adaptor element 13 by respective radial gasket seals 22. The openings 6 of the castings 5 in the filter elements 1 facing away from the adaptor element 13 are sealed by respective plugs 14. The upper castings 5 of the adaptor element 13 furthermore comprise upwardly directed flanges 15 with respective pipes 15.1 in fluid communication with the opening 6 for connecting to pipeworks (not illustrated). Connecting the filter arrangement 12 by the upwardly directed flanges 15 allows for saving space as opposed to a lateral connection at the openings 6 of the filter elements 1.

The upper castings 5 of the adaptor element 13 may comprise a second opening 19 in parallel to the opening 6. The two openings 6, 19 are interconnected by a connecting bore 20, which may be aligned with the flange 15. The second opening 19 and the connecting bore 20 may be obtained by machining, e.g. milling or drilling. Afterwards the second opening 19 is closed at the ends.

The second opening 19 serves for allowing access to the interior of the filter membrane pockets 2 regardless of the space requirements of the radial gasket seals 22 and the pipe of the flange 15 which may extend considerably into the casting 5.

Arranging the adaptor element 13 as a filter element further increases the filter surface with respect to the footprint of the filter arrangement 12.

A number of biasing elements 16 is arranged for engaging the retaining structures 8 of the filter elements 1 and, if applicable, of the adaptor element 13 and tightening them. The biasing elements 16 are switchable. For this purpose, the biasing elements 16 are arranged as or comprise pneumatic cylinders 16.1 and a leverage 16.2 with hooks for engaging the retaining structures 8. The pneumatic cylinders 16.1 may be subjected to compressed air. Thus the biasing elements 16 may be switched on for biasing the filter element 1 when starting operation. When the pneumatic cylinders 16.1 are not subjected to compressed air and hence switched off the filter elements 1 are relaxed, e.g. prior to use or when temporarily not in use thus avoiding creepage.

The two rods 7 are radially guided on inclined surfaces 17 such that the edge of the filter element 1 or adaptor element 13, respectively between the two upper castings 5 with the rods 7 is tightened when the biasing elements 16 pull on the lower castings 5. The inclined surfaces 17 are arranged on respective protrusions which may be folded in and out of the chassis 21 for facilitating insertion and removal of the filter elements 1. A stop 17.1 on the inclined surface 17 serves for limiting the extent of tension to the filter element 1.

The filter element 1 may likewise be composed of filter membrane pockets with three, five or more corners 3 and edges 4.

In alternative embodiments only one or a part of the castings 5 may have an opening for accessing the interior of the filter membrane pockets 2.

LIST OF REFERENCES 1 filter element
2 filter membrane pocket
3 corner
4 edge
5 casting
6 opening
7 rod
8 retaining structure
9 bracket
10 connecting bracket
11 conical outer surface
12 filter arrangement
13 adaptor element
14 plug
15 flange
15.1 pipe
16 biasing elements
16.1 pneumatic cylinder
16.2 leverage
17 inclined surface
18 bore
19 second opening
20 connecting bore
21 chassis
22 radial gasket seal

The invention claimed is:

1. A filter element for cleaning liquids, comprising a stack of at least two filter membrane pockets, which are substantially flat and comprise a flexible, liquid-permeable filter material for retaining waste particles and/or microbes,
wherein each filter membrane pocket has a substantially polygonal shape with at least three corners and a corresponding number of edges,
wherein the filter membrane pockets are stacked with a defined distance there between and aligned with each other when viewed perpendicular to the filter membrane pockets, and
wherein aligned corners of the filter membrane pockets are embedded in a respective common casting covering only part of adjacent edges of the filter membrane pockets that meet at each respective corner, such that the respective common casting for each of the aligned corners is spaced from the respective common castings of neighbouring aligned corners of the filter membrane pockets by parts of the adjacent edges that are not covered by the respective common castings.

2. The filter element according to claim 1, wherein at least one of the respective common castings comprises an opening for accessing an interior of the filter membrane pockets.

3. The filter element according to claim 2, wherein the opening is arranged as a bore substantially arranged at right angles with respect to a plane in which the filter membrane pockets extend.

4. The filter element according to claim 1, wherein the defined distance between all adjacent filter membrane pockets in the stack is constant.

5. The filter element according to claim 1, wherein each of the respective common castings covers at most 25% of the length of each adjacent edge at the aligned corners.

6. The filter element according to claim 2, wherein at least one of the openings is arranged at an upper edge of the filter membrane pockets for venting the filter element, the upper edge being an edge that points upward when the filter membrane pockets are oriented vertically.

7. The filter element according to claim 1, wherein a rod for suspending the filter element is provided, and wherein at least one of the respective common castings has a bore formed therein substantially arranged at right angles with respect to a plane in which the filter membrane pockets extend, wherein the rod extends through the bore.

8. The filter element according to claim 7, wherein at least two rods for suspending the filter element are provided, and wherein at least two neighbouring respective common castings have the bore formed therein, a respective one of the at least two rods extending through each respective bore.

9. The filter element according to claim 7, further comprising biasing elements, wherein at least one of the respective common castings has the bore formed therein and the remaining respective common castings comprise respective retaining structures that engage the biasing elements such that the filter element may be tightened at each corner.

10. The filter element according to claim 2, wherein an upwardly directed flange with a pipe in fluid communication with the opening is arranged on at least one of the respective common castings.

11. The filter element according to claim 10, wherein the at least one of the respective common castings with the upwardly directed flange comprises a second opening in parallel to the opening, wherein the two openings are interconnected by a connecting bore.

12. A filter arrangement comprising at least one filter element according to claim 1, and a chassis for receiving the filter element.

13. The filter arrangement according to claim 12, further comprising;
   a bore formed in at least one of the respective common castings and being substantially arranged at right angles with respect to a plane in which the filter membrane pockets extend,
   at least one rod that extends through a respective bore in one of the respective common castings of the filter element, wherein the at least one rod is retained in the chassis,
   a retaining structure formed in at least one of the respective common castings, and
   at least one biasing element that engages the retaining structure to tighten the filter element.

14. The filter arrangement according to claim 13, wherein two rods are provided and are inserted into respective bores in two neighbouring respective common castings, wherein the two rods are radially guided on inclined surfaces of protrusions that extend from the chassis, such that the edge of the filter element between these neighbouring respective common castings is tightened when the at least one biasing element pulls on the remaining respective common casting or respective common castings of the filter element, and wherein the at least one biasing element comprises a pneumatic cylinder, a leverage and a hook.

15. The filter arrangement according to claim 13, wherein the at least one biasing element is switchable ON and OFF.

16. The filter arrangement according to claim 12, wherein the filter arrangement comprises at least two filter elements, with the at least two filter elements arranged in series, wherein the openings of the at least two filter elements are respectively interconnected by a radial gasket seal.

17. The filter arrangement according to claim 16, wherein the radial gasket seal comprises a conical outer surface.

18. The filter arrangement according to claim 12, further comprising at least one air ventilation unit which is arranged in the chassis.

\* \* \* \* \*